(12) United States Patent
Chen et al.

(10) Patent No.: US 9,014,372 B2
(45) Date of Patent: Apr. 21, 2015

(54) VIDEO FILE ENCRYPTION AND DECRYPTION METHOD, DEVICE, AND MOBILE TERMINAL

(71) Applicant: Tencent Technology (Shenzhen), Co., Ltd., Shenzhen (CN)

(72) Inventors: Jian Ming Chen, Shenzhen (CN); Xiao Sheng Zheng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/063,992

(22) Filed: Oct. 25, 2013

(65) Prior Publication Data

US 2014/0105390 A1    Apr. 17, 2014

Related U.S. Application Data

(63) Continuation of application No. PCT/CN2013/081367, filed on Aug. 13, 2013.

(30) Foreign Application Priority Data

Aug. 30, 2012   (CN) .......................... 2012 1 0315011

(51) Int. Cl.
*H04N 21/647*   (2011.01)
*G06F 21/62*    (2013.01)
(Continued)

(52) U.S. Cl.
CPC .......... *H04N 21/64715* (2013.01); *G06F 21/62* (2013.01); *G06F 21/602* (2013.01);
(Continued)

(58) Field of Classification Search
CPC ....................... H04N 21/647; H04N 21/64715
See application file for complete search history.

(56) References Cited

U.S. PATENT DOCUMENTS 7,792,294 B2 *  9/2010  Candelore et al. ............ 380/210
(Continued)

FOREIGN PATENT DOCUMENTS

CN              1452840       10/2003
(Continued)

OTHER PUBLICATIONS

International Search Report and Written Opinion mailed Nov. 21, 2013, directed to International Application No. PCT/CN2013/081367; 12 pages.

*Primary Examiner* — Taghi Arani
*Assistant Examiner* — Sharon Lynch
(74) *Attorney, Agent, or Firm* — Morrison & Foerster LLP

(57) ABSTRACT

This discloses a video file encryption and decryption method, device, and mobile terminal. The encryption method can include: obtaining a to-be-encrypted video file and an encryption key, encrypting the video file using the encryption key to obtain an encrypted video file, obtaining scanned non-hidden partitions of a mobile terminal and an extended memory of the mobile terminal for storing user data, determining a partition storing the to-be-encrypted video file among the non-hidden partitions, and moving the encrypted video file to a folder in the partition storing the to-be-encrypted video file. The decryption method can include: obtaining a to-be-decrypted video file and a decryption key, decrypting the to-be-decrypted video file using the decryption key to obtain a decrypted video file, and determining a pre-encryption storage location of the to-be-decrypted video file and moving the decrypted video file to the pre-encryption storage location of the to-be-decrypted video file.

9 Claims, 14 Drawing Sheets

(51) Int. Cl.
*G06F 21/60* (2013.01)
*H04L 29/06* (2006.01)
*H04W 12/02* (2009.01)
*H04W 12/04* (2009.01)
*H04L 9/08* (2006.01)

(52) U.S. Cl.
CPC ......... *H04L63/0428* (2013.01); *H04L 63/062* (2013.01); *H04W 12/02* (2013.01); *H04W 12/04* (2013.01); *G06F 2221/2107* (2013.01); *H04L 9/0897* (2013.01); *H04L 2209/60* (2013.01); *Y10S 707/99931* (2013.01); *Y10S 707/99951* (2013.01)

(56) References Cited

U.S. PATENT DOCUMENTS

| | | | |
|---|---|---|---|
| 8,005,216 B1* | 8/2011 | Agrawal | 380/200 |
| 8,385,543 B1* | 2/2013 | Agrawal et al. | 380/200 |
| 8,683,228 B2* | 3/2014 | Stokes | 713/193 |
| 2002/0112022 A1* | 8/2002 | Kazar et al. | 709/217 |
| 2003/0158834 A1* | 8/2003 | Sawdon et al. | 707/1 |
| 2004/0107237 A1* | 6/2004 | Kashiwada | 709/200 |
| 2008/0015999 A1* | 1/2008 | Ali et al. | 705/52 |
| 2011/0170687 A1* | 7/2011 | Hyodo et al. | 380/200 |
| 2012/0134496 A1* | 5/2012 | Farkash et al. | 380/210 |

FOREIGN PATENT DOCUMENTS

| | | | | |
|---|---|---|---|---|
| CN | 1991799 | 7/2007 | | |
| CN | 102185695 | 9/2011 | | |
| CN | 102368850 | 3/2012 | | |
| CN | 102426635 | 4/2012 | | |
| CN | 102622561 | 8/2012 | | |
| WO | WO 2011/047717 | * | 4/2011 | ......... G06F 21/24 |

* cited by examiner

VIDEO FILE ENCRYPTION AND DECRYPTION METHOD, DEVICE, AND MOBILE TERMINAL

CROSS REFERENCE TO RELATED APPLICATION

This application is a U.S. continuation application under 35 U.S.C. §111(a) claiming priority under 35 U.S.C. §§120 and 365(c) to International Application No. PCT/CN2013/081367 filed Aug. 13, 2013, which claims the priority benefit of Chinese Patent Application No. 201210315011.X, filed on Aug. 30, 2012, the contents of both the PCT application and Chinese application are incorporated by reference herein in their entirety for all purposes.

FIELD

This relates to the mobile terminal field, and in particular, a video file encryption and decryption method, device, and mobile terminal.

BACKGROUND

As the hardware of mobile terminals and extended memory develop, a user can store a large amount of files at a mobile terminal and its extended memory and search these files via the mobile terminal. To protect privacy and the security of the files, the user may wish to encrypt the files.

Encryption can be a particular type of algorithm to change the original data of a file, thus preventing an unauthorized user having obtained the encrypted file from knowing the content of the file because he does not know the decryption method. Typically, these files include text documents, programs, images, and videos. Regarding video files, existing video file encryption method can be used to perform encryption. In particular, an existing video file encryption method can include, first encrypting the whole video file to obtain an encrypted video file, and then moving the encrypted video file from its original storage location to a designated storage location.

It is discovered that this existing technology has at least the following problems.

Video files are the largest files among all the files. When the designated storage location is in a disk partition different from the disk partition including the original storage location, the speed of moving the encrypted video file can be very slow, affecting the encryption efficiency.

SUMMARY

To solve the existing technical problems, embodiments of the disclosure provide a video file encryption and decryption method, device, and mobile device. The technical solutions can include the following.

A video file encryption method, including:
obtaining a to-be-encrypted video file and an encryption key,
encrypting the video file using the encryption key to obtain an encrypted video file,
obtaining scanned non-hidden partitions of a mobile terminal and an extended memory of the mobile terminal for storing user data,
determining a partition storing the to-be-encrypted video file among the non-hidden partitions, and moving the encrypted video file to a folder in the partition storing the to-be-encrypted video file.

The method can also include:
scanning the non-hidden partitions of the mobile terminal and the extended memory of the mobile terminal, and
creating a folder in each of the partitions from the scan.

Encrypting the video file using the encryption key to obtain the encrypted video file can include:
reading header data having a length equal to a first length and stored in a header of the to-be-encrypted video file,
encrypting the header data using the encryption key to obtain ciphertext, and
obtaining the encrypted video file in accordance with the ciphertext and remaining non-header data in the to-be-encrypted video file.

Obtaining the encrypted video file in accordance with the ciphertext and the remaining non-header data in the to-be-encrypted video file can include:
obtaining a header data storage area in the to-be-encrypted video file,
obtaining, based on the header data storage area, a designated header data storage area having a second length and a ciphertext storage area, the second length less than the first length, the designated header data comprising the storage area for storing the encryption key and an encryption ID,
generating the designated header data while maintaining the remaining non-header data in the to-be-encrypted video file, writing the designated header data and the encryption key into respective corresponding storage areas to obtain the encrypted video file.

Obtaining, based on the header data storage area, the designating header storage area having the second length can include:
starting from a start point of the header data in the storage area for the to-be-encrypted video file, obtaining a storage area having the second length for storing data as the designated header data storage area.

Obtaining the ciphertext storage area based on the header data storage area can include:
obtaining a length of the ciphertext, and determining whether the length of the ciphertext is greater than a difference between the first length and the second length,
if the length of the ciphertext is less than the difference, subtracting the designated header storage area from the header area storage area to obtain the ciphertext storage area,
if the length of the ciphertext is greater than the difference, subtracting the header data storage area from the designated header data storage area to obtain a partial ciphertext storage area having a length equal to the difference, obtaining a storage area for the to-be-encrypted video file, starting from the end point of the storage area for the to-be-encrypted video file, obtaining a storage area having a length of a remaining part of the ciphertext to obtain a remaining ciphertext storage area.

Determining a partition storing the to-be-encrypted video file among the non-hidden partitions and moving the encrypted video file to a folder in the partition storing the to-be-encrypted video file can include:
obtaining inode information associated with the to-be-encrypted video file, the inode information comprising a storage path, the inode information corresponding to video data,
allocating, in accordance with the storage path associated with the to-be-encrypted video file, one of the partitions for storing the to-be-encrypted video file,
calculating, in accordance with the folder of the partition for storing the to-be-encrypted video file, a storage path associated with the encrypted video file so that the storage path associated with the encrypted video file points to the folder in the partition for storing the to-be-encrypted video file, obtaining inode information associated with the encrypted video file, and changing the inode information associated with the to-be-encrypted video file to the inode information associated with the encrypted video file to move the encrypted video file to the folder of the partition for storing the to-be-encrypted video file.

The method can also include:

establishing a correspondence between the inode information associated with the to-be-encrypted video file and the inode information associated with the encrypted video file.

A video file decryption method can include:

obtaining a to-be-decrypted video file and a decryption key, decrypting the to-be-decrypted video file using the decryption key to obtain a decrypted video file, and determining a pre-encryption storage location of the to-be-decrypted video file and moving the decrypted video file to the pre-encryption storage location of the to-be-decrypted video file.

Decrypting the to-be-decrypted video file using the decryption key to obtain the decrypted video file can include:

reading header data having a second length and stored in a header of the to-be-decrypted video file and obtaining a ciphertext storage area in accordance with the header data, reading the ciphertext in accordance with the ciphertext storage area, decrypting the ciphertext using the decryption key to obtain an plaintext, the decrypted ciphertext having a first length greater than a second length, and obtaining the decrypted video file in accordance with the decrypted ciphertext and remaining data in the to-be-decrypted video file other than the header data and the ciphertext.

Obtaining the decrypted video file in accordance with the plaintext and remaining data in the to-be-decrypted video file other than the header data and the ciphertext can include:

obtaining a to-be-decrypted video file storage area, starting from a start point of the to-be-decrypted video file storage area, obtaining a storage area having a first length as a plaintext storage area, maintaining the remaining data in the to-be-decrypted video file, overwriting the plaintext storage area with plaintext to obtain the decrypted video file.

The to-be-decrypted video file can include a preview-required video file. The method can also include:

reading the plaintext of the first length and the remaining data, and making a streaming video from the plaintext and the remaining data to be provided to a streaming media for broadcasting.

Determining the pre-encryption storage location of to-be-decrypted video file and moving the decrypted video file to the pre-encryption storage location of the to-be-decrypted video file can include:

obtaining inode information associated with the to-be-decrypted video file, obtaining an established correspondence between inode information associated with a to-be-encrypted video file and inode information associated with an encrypted video file, obtaining, from the established correspondence, pre-encryption inode information corresponding to the inode information associated with the to-be-encrypted video file, the pre-encryption inode information comprising the to-be-encrypted video file and a pre-encryption storage path, changing the inode information associated with the to-be-decrypted video file to the pre-encryption inode information to move the decrypted video file to a storage location indicated by the pre-encryption storage path.

A video file encryption device including:

a first obtaining module that obtains a to-be-encrypted video file and an encryption key, an encryption module that encrypts the to-be-encrypted video file using the encryption key to obtain an encrypted video file, a second obtaining module that obtains scanned non-hidden partitions of a mobile terminal and an extended memory of the mobile terminal for storing user data, and a first moving module that determines a partition storing the to-be-encrypted video file among the non-hidden partitions and moves the encrypted video file to a folder in the partition storing the to-be-encrypted video file.

The device can also include:

a scanning module that scans the non-hidden partitions of the mobile terminal and the extended memory of the mobile terminal, and creates a folder in each of the scanned partitions.

The encryption module can include:

a first read sub-module that reads a header data having a first length and stored in a header of the to-be-encrypted video file, an encryption sub-module that encrypts the header data using the encryption key to obtain ciphertext, and a write sub-module that obtains the encrypted video file in accordance with the ciphertext and remaining non-header data in the to-be-encrypted video file.

The write sub-module can include:

a first obtaining unit that obtains a header data storage area in the to-be-encrypted video file, a second obtaining unit that obtains, based on the header data storage area, a designated header data storage area having a second length, the second length less than the first length, the designated header data comprising the storage area for storing the encryption key and an encryption ID, a third obtaining unit that obtains a ciphertext storage area, a write unit that generates the designated header data while maintaining the remaining non-header data in the to-be-encrypted video file, and writes the designated header data and the encryption key into respective storage areas to obtain the encrypted video file.

The second obtaining unit, starting from a start point of the header data in the storage area for the to-be-encrypted video file, obtains a storage area having a second length as the designated header data storage area.

The third obtaining unit can include:

a determining sub-module that obtains a length of the ciphertext, and determines whether the length of the ciphertext is greater than a difference between the first length and the second length, a first ciphertext storage area sub-module that, if the length of the ciphertext is less than the difference, subtracting the designated header data storage area from the header data storage area to obtain the ciphertext storage area, a second ciphertext storage area sub-module that, if the length of the ciphertext is greater than the difference, subtracting the header data storage area from the designated header data storage area to obtain a partial ciphertext storage area having a length equal to the difference, obtaining the storage area for the to-be-encrypted video file, starting from the end point of the to-be-encrypted video file in the storage area, obtaining a storage space having a length of a remaining part of the ciphertext to obtain a remaining ciphertext storage area.

The first moving module can include:

a first obtaining sub-module that obtains inode information associated with the to-be-encrypted video file, the inode information comprising a storage path, the inode information corresponding to video data, an allocation sub-module that allocates, in accordance with the storage path associated with the to-be-encrypted video file, one of the partitions for storing the to-be-encrypted video file, a calculating sub-module that calculates, in accordance with the folder of the partition storing the to-be-encrypted video file, a storage path associated with the encrypted video file so that the storage path associated with the encrypted video file points to the folder in the partition for storing the to-be-encrypted video file, obtaining inode information associated with the encrypted video file, and a first changing sub-module that changes the inode information associated with the to-be-encrypted video file to the inode information associated with the encrypted video file to move the encrypted video file to the folder of the partition for storing the to-be-encrypted video file.

The first moving module can include:

an establishing sub-module that establishes a correspondence between the inode information associated with the to-be-encrypted video file and the inode information associated with the encrypted video file.

A video file decryption device including:

a third obtaining module that obtains a to-be-decrypted video file and a decryption key, a decryption module that decrypts the to-be-decrypted video file using the decryption key to obtain a decrypted video file, and a second moving module that determines a pre-encryption storage location of to-be-decrypted video file and moves the decrypted video file to the pre-encryption storage location of the to-be-decrypted video file.

The decryption module can include:

a second read sub-module that reads header data having a second length and stored in a header of the to-be-decrypted video file, obtaining a storage area of ciphertext in accordance with the header data, a third read sub-module that reads the ciphertext in accordance with the storage area of the ciphertext, a decryption module that decrypts the ciphertext using the decryption key to obtain an plaintext, the plaintext having a first length greater than a second length, and an overwriting sub-module that obtains the decrypted video file in accordance with the plaintext and remaining data in the to-be-decrypted video file other than the header data and the ciphertext.

The overwriting sub-module can include:

a fourth obtaining module that obtains a storage area associated with the to-be-decrypted video file, a fifth obtaining module that, starting from a start point of the storage area associated with the to-be-decrypted video file, obtains a storage area having the first length as a plaintext storage area, and an overwriting unit that maintains the remaining data in the to-be-decrypted video file, overwriting the plaintext storage space with the plaintext to obtain the decrypted video file.

The to-be-decrypted video file can include a preview-required video file, and the decryption module can include:

a preview sub-module that reads the plaintext of the first length and the remaining data, and makes a streaming video from the plaintext and the remaining data to be provided to a streaming media for broadcasting.

The second moving module including:

a second obtaining sub-module that obtains inode information associated with the to-be-decrypted video file, a third obtaining sub-module that obtains an established correspondence between inode information associated with a to-be-encrypted video file and inode information associated with an encrypted video file, a fourth obtaining sub-module that obtains, from the established correspondence, pre-encryption inode information corresponding to the inode information associated with the to-be-encrypted video file, the pre-encryption inode information comprising the to-be-encrypted video file and a pre-encryption storage path, and a second changing sub-module that changes the inode information associated with the to-be-decrypted video file to the pre-encryption inode information to move the decrypted video file to a storage location indicated by the pre-encryption storage path.

A mobile terminal can include the above-described video file encryption device and the above-described video file decryption device.

Some of the positive effects of the technical solutions provided in the embodiments of the disclosure can include: obtaining an encrypted video file by obtaining the to-be-encrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

BRIEF DESCRIPTION OF THE DRAWINGS

To better explain the technical solutions in the embodiments of the disclosure, the figures discussed in the following embodiments are briefly introduced. It should be understood that the figures described below correspond to only some of the embodiments and that other figures can be derived from these figures.

DETAILED DESCRIPTION

A detailed description of the technical solutions of the embodiments of the present disclosure is provided below in view of the accompanying drawings. It should be understood that the embodiments described below are representative embodiments of the present disclosure rather than a complete disclosure of the every possible embodiment. The present disclosure can also include any other embodiments that can be derived from these disclosed embodiments by a person with ordinary skill in the art without any additional inventive work. It is to be understood that other embodiments can be used and structural changes can be made without departing from the scope of the embodiments of this disclosure.

To clarify the goals, technical solutions, and advantages of the present disclosure, a detailed description of exemplary embodiments of the disclosure is provided below in view of the figures.

Figure 1:
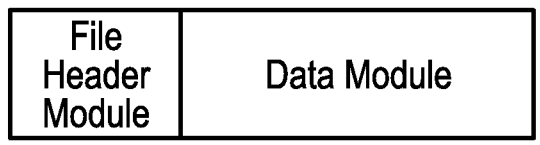
FIG. 1 is a schematic diagram of the exemplary structure of a video file provided in an embodiment of the disclosure.

To facilitate describing the technical solutions of the embodiments, an exemplary video file is first introduced. Referring to FIG. 1, the exemplary video file can typically include two parts, a file header module and a data module. The file header module can typically be stored in the file header of the video file and include parameters such as the general information, defined data formats, and compression algorithm associated with the video file. The data module can be added after the file header module and include the actual video streaming data including, for example, the sequence data module of the image and sound. The data module can be the main part of the video file. In addition, the data module can also include a sequence data block list and its corresponding location in the file and be responsible for ensuring that the data within the video file can be random accessed.

Embodiment 1

Figure 2:
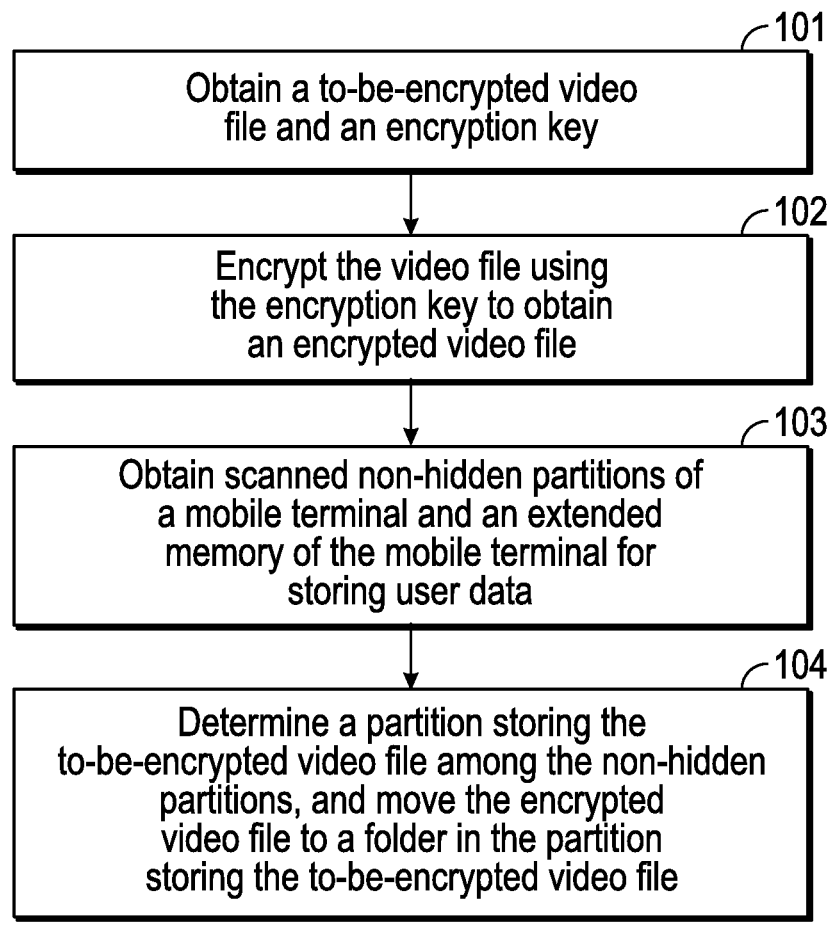
FIG. 2 is a flowchart illustrating the exemplary steps of a video file encryption method, according to a first embodiment of the disclosure.

Referring to FIG. 2, a video file encryption method is provided in a first embodiment of the disclosure, the method can includes:

101: obtaining a to-be-encrypted video file and an encryption key.

102: encrypting the video file using the encryption key to obtain an encrypted video file.

103: obtaining scanned non-hidden partitions of a mobile terminal and an extended memory of the mobile terminal for storing user data.

104: determining a partition storing the to-be-encrypted video file among the non-hidden partitions, and moving the encrypted video file to a folder in the partition storing the to-be-encrypted video file.

Some of the positive effects of the technical solutions provided in the embodiments of the disclosure can include: obtaining an encrypted video file by obtaining the to-be-encrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

Embodiment 2

Figure 3A:
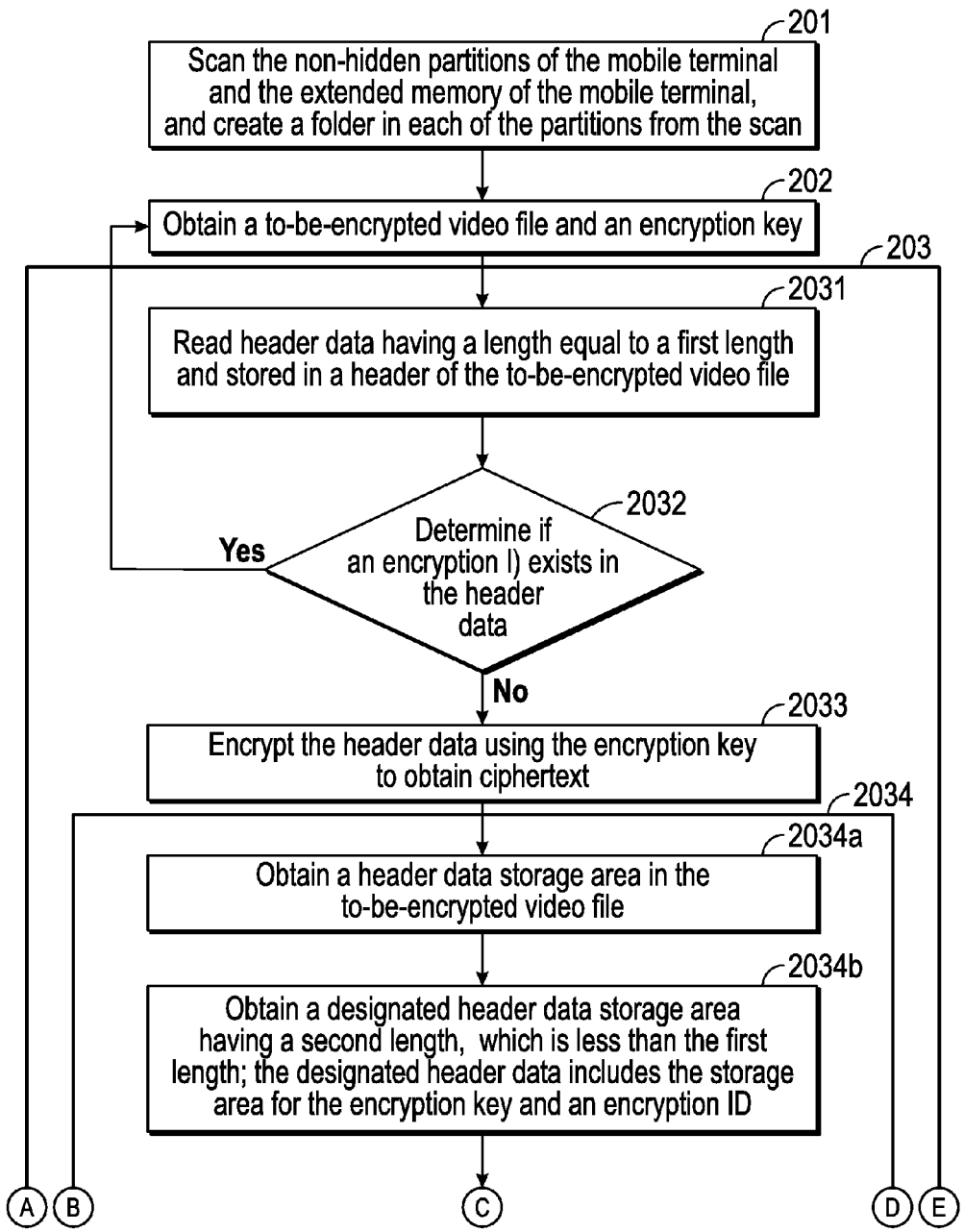
FIGS. 3a and 3b are flowcharts illustrating the exemplary steps of a video file encryption method, according to a second embodiment of the disclosure.
Figure 3A:
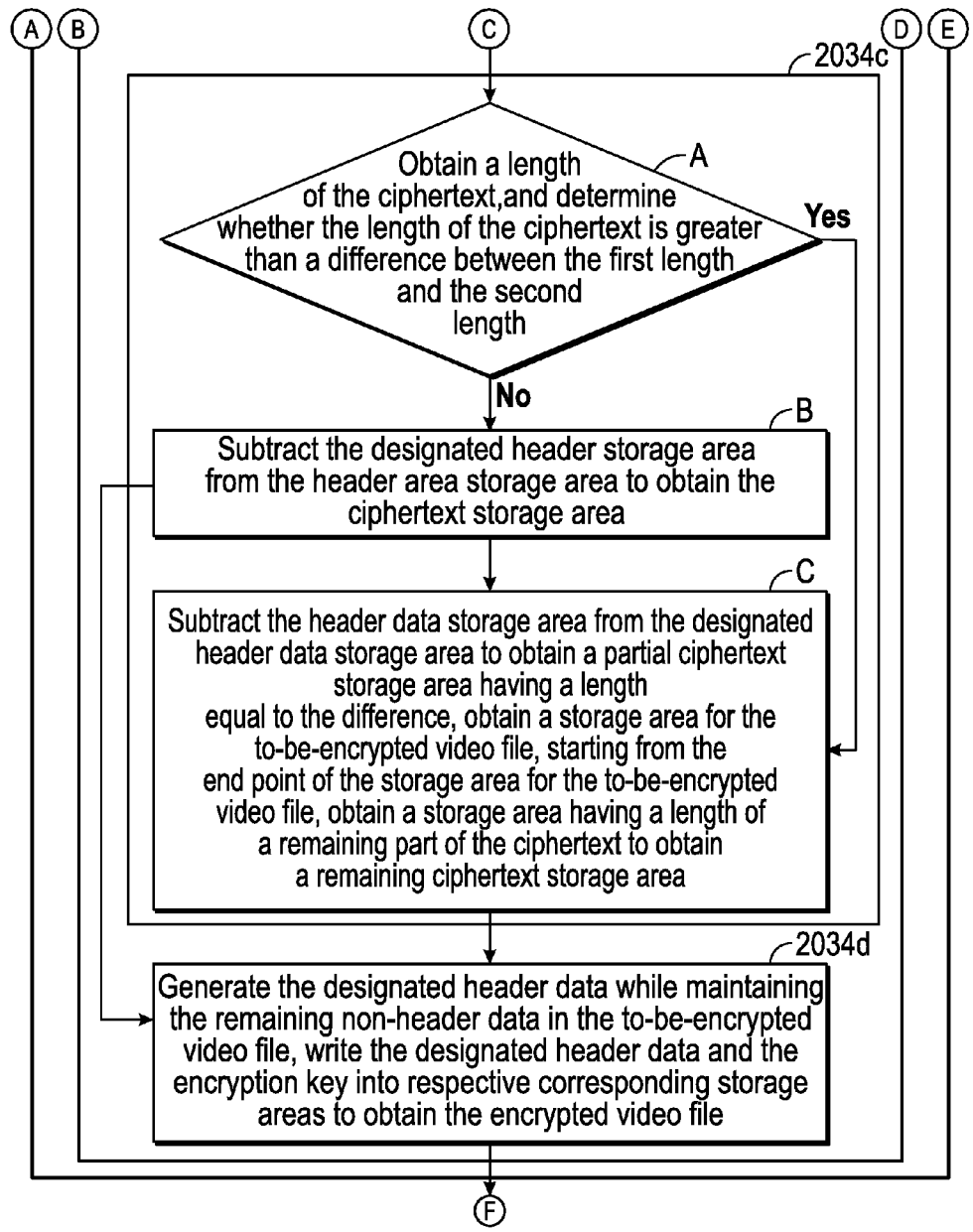
Figure 3B:
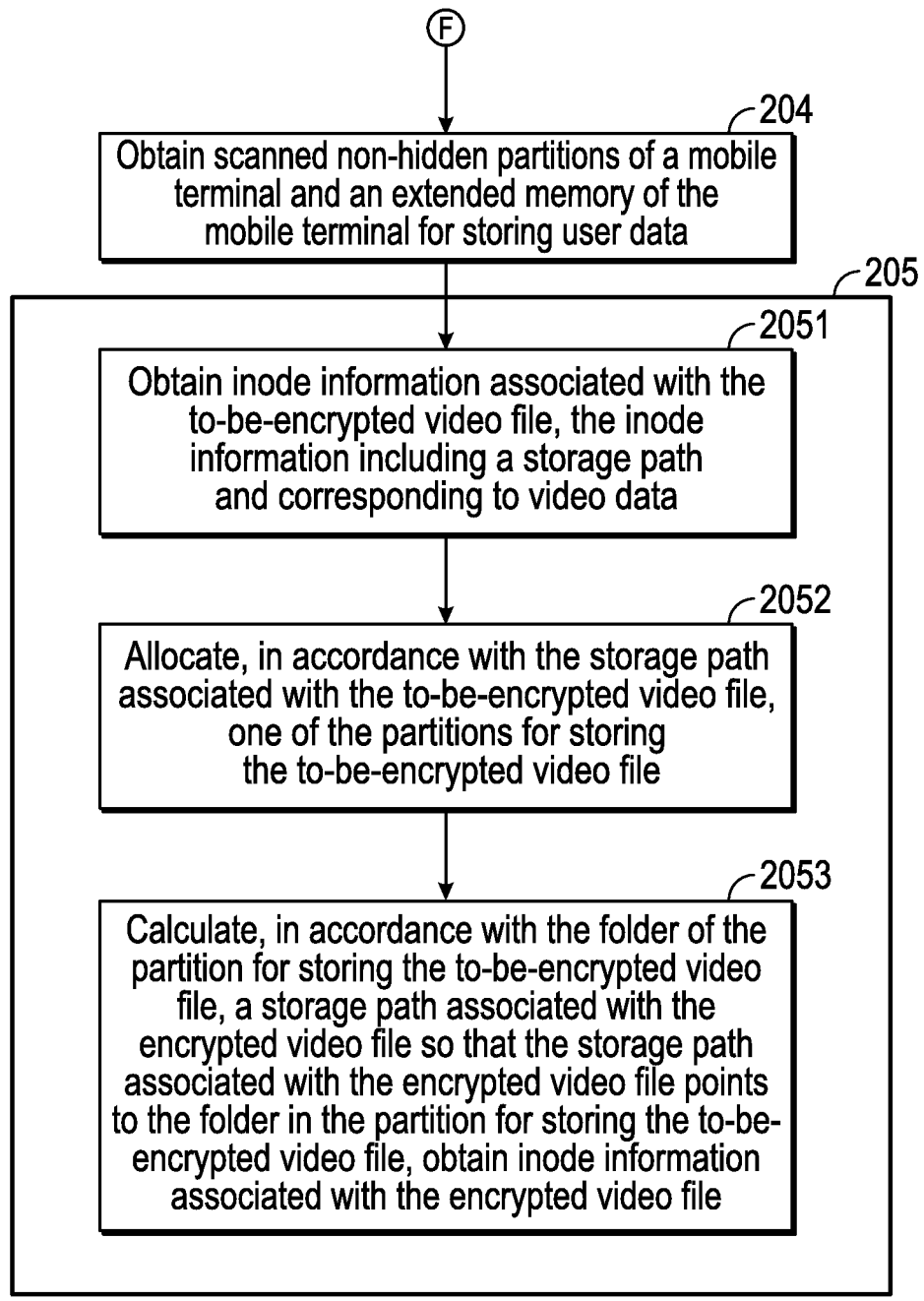

Referring to FIGS. 3a and 3b, another video file encryption method is provided in a second embodiment of the disclosure, the method can include:

201: scanning the non-hidden partitions of the mobile terminal and the extended memory of the mobile terminal, and creating a folder in each of the partitions from the scan.

Prior to encrypting the video file, it may be necessary to first scan the non-hidden partitions of the mobile terminal and the extended memory of the mobile terminal. Because the internal memory of the mobile terminal may be limited in size, a user can typically store the video file in an extended memory, such as a Secure Digital (SD) card. In particular, at a mobile terminal using the Android platform, scanning the non-hidden partitions of an SD card for storing user data can include, first, reading the "/proc/mounts" file of the system to obtain the mounts of the whole system; next, filtering out the unnecessary mount information such as, rootfs, tmpfs, proc, devpts, etc.; next, filtering out the known invalid partitions of the SD card in the Android system, including, for example, asec, .android_secure, obb; finally, filtering out the valid partitions corresponding to the vfat file system ID, i.e., the non-hidden partitions for storing user data. For example, there can be two non-hidden partitions for storing user data in the SD card, "/mnt/sdcard" and "/mnt/sdcard/_external."

After finishing scanning the partitions, a new folder can be created in each of the partition. The folder can be for storing an encrypted video file. In particular, a hidden folder .tmfs can be created under a corresponding mount directory in each of the valid partition. The hidden folder can be for storing an encrypted video file as discussed below.

202: obtaining a to-be-encrypted video file and an encryption key.

In particular, the exemplary interactions between the user and the client installed at the mobile terminal are briefly described below using an Android user as an example.

To improve the security of the files, the user can seek to encrypt some of the video files. First, the user can start the terminal and set an encryption/decryption key for video files that require encryption in accordance with the prompting information displayed at the terminal. Then, the user can select one of the to-be-encrypted video files to submit to the terminal. Next, the user can verify that the submitted information is correct and submit an encryption request.

In particular, after receiving the request, the terminal can obtain the encryption key set by the user and the to-be-encrypted video file.

203: encrypting the video file using the encryption key to obtain an encrypted video file.

This step can further include:

2031: reading header data having a length equal to a first length and stored in a header of the to-be-encrypted video file.

Figure 4:
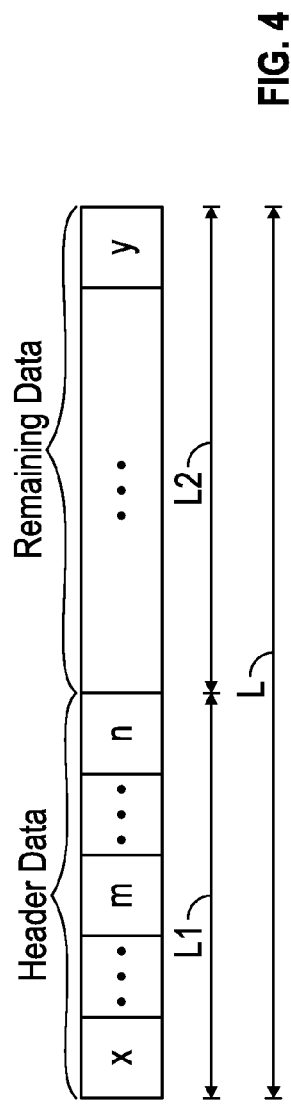
FIG. 4 is a schematic diagram of the exemplary structure of a to-be-encrypted video file, according to the second embodiment of the disclosure.

After obtaining the to-be-encrypted video file, the header data stored in the header of the to-be-encrypted video file can be read. In particular, the header data can be a data block of a first length, e.g., 1 KB, in the file header of the video file. Because individual video file typically has a size of over 50 MB, 1 KB of header data can be a relatively small portion of the video file. In the second embodiment of the disclosure, as illustrated in FIG. 4, assuming the full length of the to-be-encrypted file is L and the first length can be L1, then the remaining data in the video file other than the header data can have a length of L2. That is, L=L1 +L2.

2032: determining if an encryption identity (ID) exists in the header data.

If an encryption ID exists, it can be determined that the to-be-encrypted video file has already been encrypted and the mobile terminal can exit this encryption process and obtain the next to-be-encrypted video file. If no encryption ID exists, it can be determined that the to-be-encrypted video file has not been encrypted and step 2033 can be executed.

An encryption ID can be set. The encryption ID can be stored in the header of the encrypted video file to identify the encrypted video file to prevent the user from encrypting the already-encrypted video file again. Of the to-be-encrypted video file is an already-encrypted video file, its header data should include the encryption ID. In particular, this can be done by searching for the encryption ID in the header data. If the header data includes the encryption ID, the to-be-encrypted video file can be an already-encrypted video file and the mobile terminal can exit this encryption process. If no encryption ID is found in the header data, the to-be-encrypted video file can be determined as a video file that has not been encrypted and step 2033 can be executed.

2033: encrypting the header data using the encryption key to obtain ciphertext.

In particular, the encryption method provided in the second embodiment can use an Advanced Encryption Standard (AES) encryption algorithm, typically including two parts—a key expansion algorithm and an encryption (decryption) algorithm. The key expansion algorithm can expand a b-byte user master key to r number of subkeys. The encryption algorithm can include a weak cryptographic function f and r number of r-th iteration of the subkeys. This is existing technology and is thus not described in detail.

In particular, the terminal can first expand the key into a number of subkeys using the AES expansion algorithm and then encrypting the header data using the AES encryption algorithm in accordance with the subkeys to obtain a ciphertext associated with the encrypted header data.

2034: obtaining the encrypted video file in accordance with the ciphertext and remaining non-header data in the to-be-encrypted video file.

This step can further include:

2034a: obtaining a header data storage area in the to-be-encrypted video file.

In accordance with the header data, a storage area of the header data in the to-be-encrypted video file can be obtained. The storage area can be a memory address segment associated with the header data at the mobile terminal or SD card (or other types of extended memory). In particular, referring to FIG. 4, the storage area associated with the header data can be designated by [x, n] in the to-be-encrypted video file. That is, the storage area [x, n] can store data of a first length L1.

2034b: obtaining a designated header data storage area having a second length.

The second length can be less than the first length. The designated header data can include the storage area for storing the encryption key and an encryption ID.

In particular, obtaining a designed header data storage area having a second length can include: starting from a start point of the header data in the storage area for the to-be-encrypted video file, obtaining a storage area having the second length for storing data as the designated header data storage area.

Figure 5:
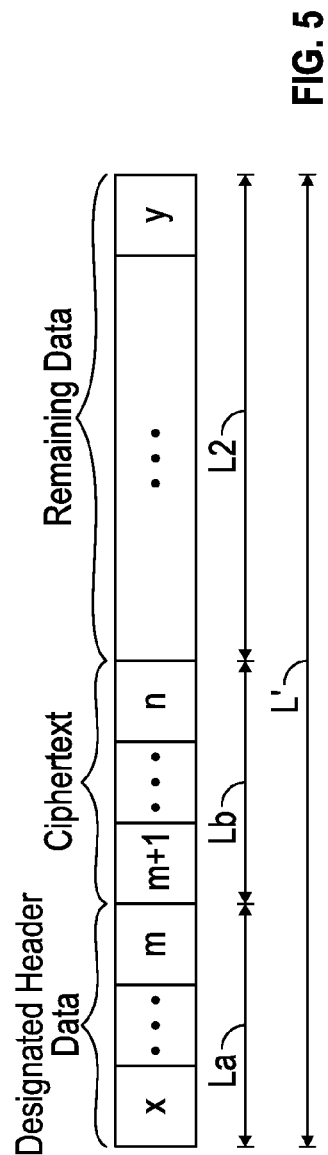
FIG. 5 is a schematic diagram of the exemplary structure of an encrypted video file, according to the second embodiment of the disclosure.
Figure 6:
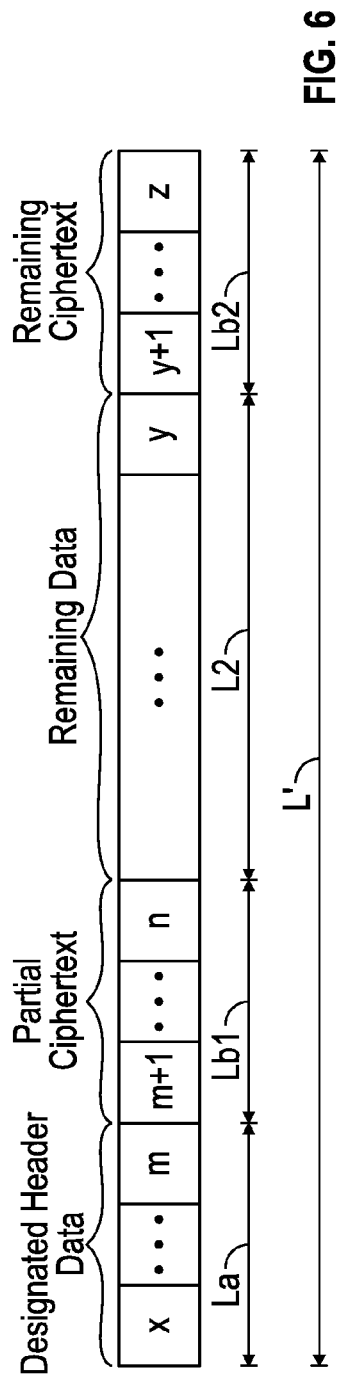
FIG. 6 is a schematic diagram of the exemplary structure of an encrypted video file, according to the second embodiment of the disclosure.

In particular, the designated header data can be used to mark the encrypted video file and identify the storage location of the ciphertext to provide supplementary information during the below-described decryption process and the process of previewing the encrypted video. The designated header data can be a data block having a second length, e.g., 56B (less than 1 KB). In the second embodiment of the disclosure, as illustrated in FIGS. 5 and 6, the designated header data storage area can be designated as [x, m]. The second length can be La. That is, the length of data storage block [x, m] can be La.

2034c: obtaining a ciphertext storage area.

This step can further include the following steps A-C:

Step A: obtaining a length of the ciphertext, and determining whether the length of the ciphertext is greater than a difference between the first length and the second length.

If the length of the ciphertext is less than or equal to the difference, perform step B; if the length of the ciphertext is greater than the difference, perform step C.

In particular, based on the ciphertext from the encrypted header data, a length of the ciphertext can be obtained. The length of the ciphertext can be Lb. It is already known that the header data has a first length L1 and the second length can be La. If Lb is less than or equal to L1 −La, perform step B; if Lb is greater than L1 −La, perform step C.

Step B: subtracting the designated header storage area from the header area storage area to obtain the ciphertext storage area. Perform step 2034d.

In particular, it is known that the header data storage area can be [x, n], the designed header storage area can be [x, m]. Thus, the ciphertext storage area can be [m+1, n] with a length of Lb. Step 2034d can be performed.

Step C: subtracting the header data storage area from the designated header data storage area to obtain a partial ciphertext storage area having a length equal to the difference, obtaining a storage area for the to-be-encrypted video file, starting from the end point of the storage area for the to-be-encrypted video file, obtaining a storage area having a length of a remaining part of the ciphertext to obtain a remaining ciphertext storage area. Perform step 2034d.

In particular, the ciphertext can have a length of Lb. A first part of the ciphertext can have a length of Lb1 and a second remaining part of the ciphertext can have a length of Lb2. Lb=Lb1 +Lb2. The first part of the ciphertext can be stored in the above-described storage area [m+1, n]. That is, the length of the storage area [m+1, n] can be Lb1.

The storage area of the to-be-encrypted video file can be one or more corresponding memory address segments in the mobile terminal or an extended memory such as an SD card. In particular, the storage area of the to-be-encrypted video file can be obtained based on the obtained to-be-encrypted video file. In the second embodiment, as illustrated in FIG. 4, the obtained storage area of the to-be-encrypted video file can be designated [x, y].

In particular, it can be known that the storage area of the to-be-encrypted video file is [x, y] and the end point of the storage area of the to-be-encrypted video file is y. As such, a partial ciphertext storage area in the encrypted video file can be [y+1, z]. The length of the storage area [y+1, z] can be Lb2. Step 2034*d* can be performed.

2034*d*: generating the designated header data while maintaining the remaining non-header data in the to-be-encrypted video file, writing the designated header data and the encryption key into respective corresponding storage areas to obtain the encrypted video file.

First, the designated header data can be generated in accordance with the encryption ID and the ciphertext storage area in the encrypted video file. In particular, the encryption ID can be stored in the header of the designated header data, i.e., the header of the encrypted video file. In addition, the process of generating the designated header data may be required to follow a relevant protocol.

In particular, after obtaining the designated header data storage area and the ciphertext storage area, the designated header data and the ciphertext can be written into their respective storage areas. If the encrypted video file has a length of L', as illustrated in FIGS. 5 and 6, the encrypted video file can include the designated header data, ciphertext, and the remaining data from the to-be-encrypted video file other than the header data. Because part of the original data in the to-be-encrypted video file has been "disrupted," conventionally video decoder would not be able to parse and decrypt this file, thereby protecting the privacy of the user.

204: obtaining scanned non-hidden partitions of a mobile terminal and an extended memory of the mobile terminal for storing user data.

In particular, the non-hidden partitions of a mobile terminal and an extended memory of the mobile terminal for storing user data can be obtained via the scanning of step 201. For example, two partitions, "/mnt/sdcard" and "imnt/sdcard/_external" can be obtained.

205: determining a partition storing the to-be-encrypted video file among the non-hidden partitions, and moving the encrypted video file to a folder in the partition storing the to-be-encrypted video file.

This step can further include:

2051: obtaining inode information associated with the to-be-encrypted video file.

The inode information can include a storage path. The inode information can correspond to video data.

Typically, the Android platform is built based on the Linux kernel and thus possesses Linux's excellent file system. This file system utilizes inodes and blocks associated with the inodes for managing the files in the system. The inodes can mark the characteristics of a file, such as the name, size, storage path, format and other information associated with the file. A block can be used for marking the particular data content of the file. That is, files having the same data content but different characteristics in the same disk partition can have different inodes. But there is only one block associated with these inodes. This is existing technology and is thus not described in detail. This embodiment can utilize this existing technology to quickly move the encrypted and decrypted video files. For example, the storage path of the to-be-encrypted video file can be "/mnt/sdcard/_external/test_dir/test.txt."

2052: allocating, in accordance with the storage path associated with the to-be-encrypted video file, one of the partitions for storing the to-be-encrypted video file.

A partition for storing to-be-encrypted video file can be allocated among the partitions in accordance with the "longer the better" allocation rule. For example, it is already known that the two non-hidden partitions for storing user data in the SD card can be "/mnt/sdcard" and "imnt/sdcard/_external," respectively. The storage path of the to-be-encrypted video file can be "/mnt/sdcard/_external/test_dir/test.txt." First, the storage directory associated with the to-be-encrypted video file can be "/mnt/sdcard/_external/test_dir." Then, one of the two partitions can be allocated. Accordingly, the result, based on the "longer the better" rule, can be "/mnt/sdcard/_external," which is the partition for storing the to-be-encrypted video file.

2053: calculating, in accordance with the folder of the partition for storing the to-be-encrypted video file, a storage path associated with the encrypted video file so that the storage path associated with the encrypted video file points to the folder in the partition for storing the to-be-encrypted video file, obtaining inode information associated with the encrypted video file.

In particular, it can be known that the partition for storing the to-be-encrypted video file is "/mnt/sdcard/_externaland" the folder in the partition is "test_file." It can also be assumed that the file name of the encrypted file is the same as the to-be-encrypted file. For example, both can be "test.txt." Then, the storage path of the encrypted video file can be calculated as "/mnt/sdcard/_external/test_file/test.txt."

In particular, the inode information associated with the encrypted video file can include the storage path of the encrypted video file.

2054: changing the inode information associated with the to-be-encrypted video file to the inode information associated with the encrypted video file to move the encrypted video file to the folder of the partition for storing the to-be-encrypted video file.

In particular, the read speed of the SD card can be relatively slow. It may be very slow to move the data of the encrypted video file directly, thus affecting user experience. In the embodiments of the disclosure, the encrypted video file can be moved to a designated folder by only changing the inode information of the encrypted video file without moving any of the data content of the file. It can achieve high efficiency in moving a file.

2055: establishing a correspondence between the inode information associated with the to-be-encrypted video file and the inode information associated with the encrypted video file.

The correspondence can be stored in a database format. Because database created by a default application program is stored under the private directory of the application program under the Android platform, it can be deleted when the program is uninstalled. As such, to ensure that the database can remain after the application program is uninstalled, the user can recover the original encrypted file by reinstalling the corresponding application program, as described below, to prevent the loss of data. The database described in the second embodiment of the disclosure can create a SQL database using a designated directory in the SD card and have complete access control of the database. In operation, an "SDCardSQLiteOpenHelper.java" file can be created based on Android's own "SQLiteOpenHelper.java" file to change the operations related to data creation under the private directory of an application program to creating database under a designated directory in the SD card. This can provide the caller a unified interface for the database-related operation such as "query," "insert," "update," and "delete."

Some of the positive effects of the technical solutions provided in the embodiments of the disclosure can include: obtaining an encrypted video file by obtaining the to-beencrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

Embodiment 3

Figure 7:
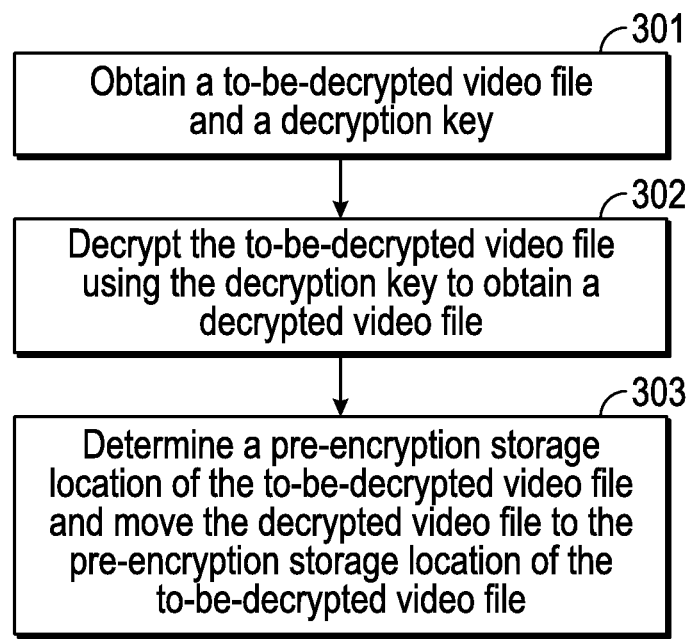
FIG. 7 is a flowchart illustrating the exemplary steps of a video file decryption method, according to a third embodiment of the disclosure.

Referring to FIG. 7, a video file decryption method is provided in a third embodiment of the disclosure. The method can include:

301: obtaining a to-be-decrypted video file and a decryption key.

302: decrypting the to-be-decrypted video file using the decryption key to obtain a decrypted video file.

303: determining a pre-encryption storage location of the to-be-decrypted video file and moving the decrypted video file to the pre-encryption storage location of the to-be-decrypted video file.

Some of the positive effects of the technical solutions provided in the embodiments of the disclosure can include: obtaining an encrypted video file by obtaining the to-be-encrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

Embodiment 4

Figure 8A:
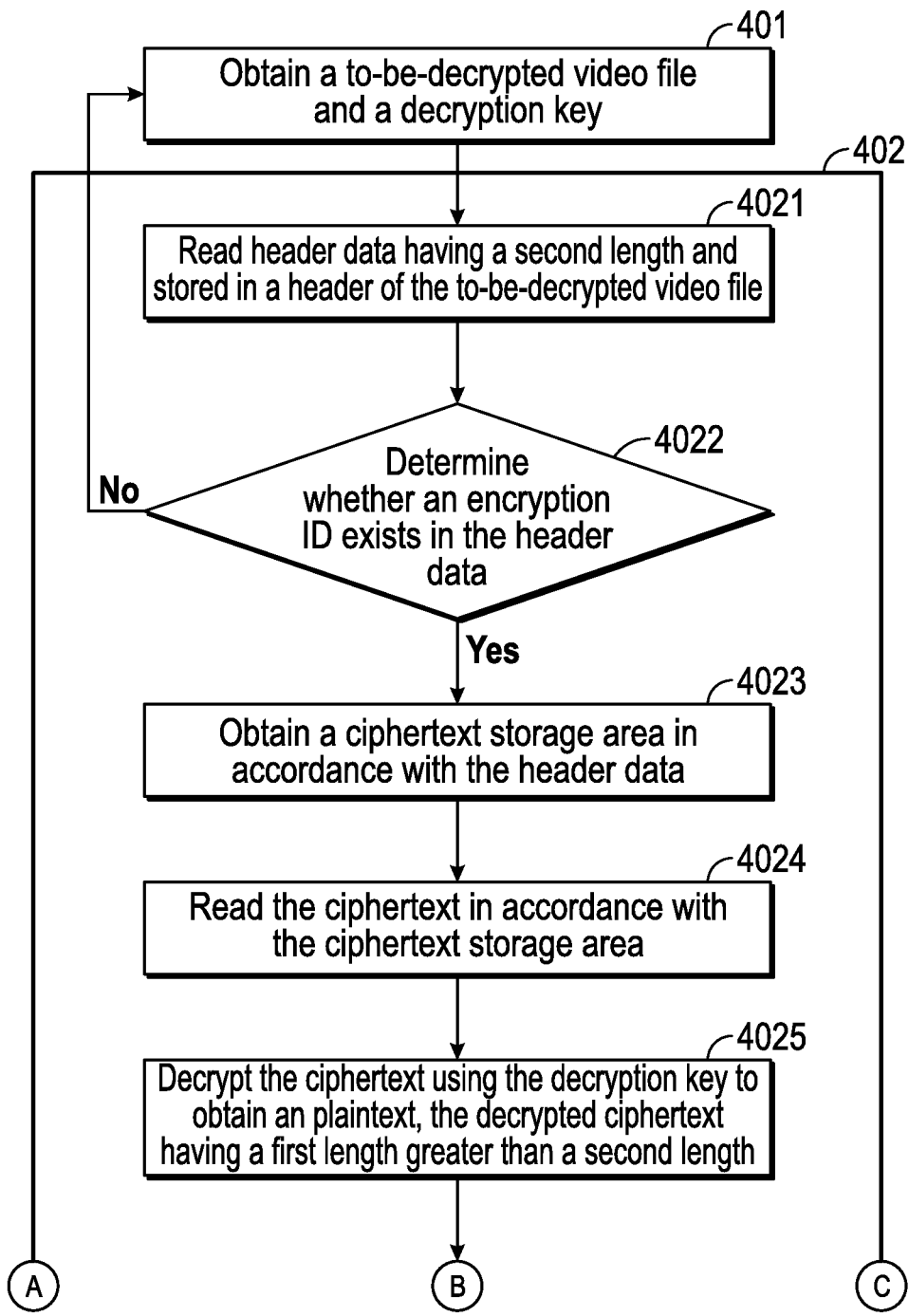
FIGS. 8a and 8b are flowcharts illustrating the exemplary steps of a video file decryption method, according to a fourth embodiment of the disclosure.
Figure 8A:
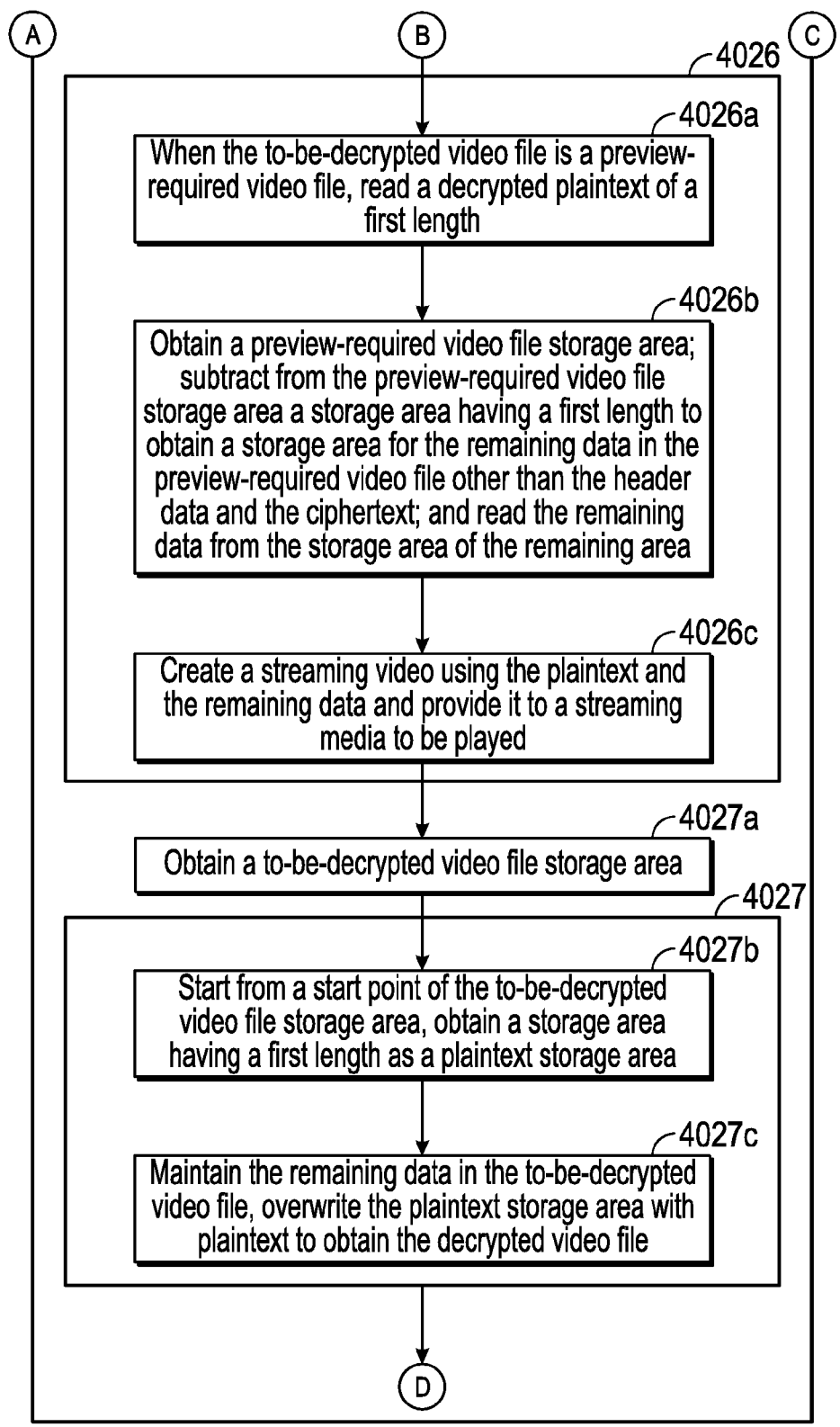
Figure 8B:
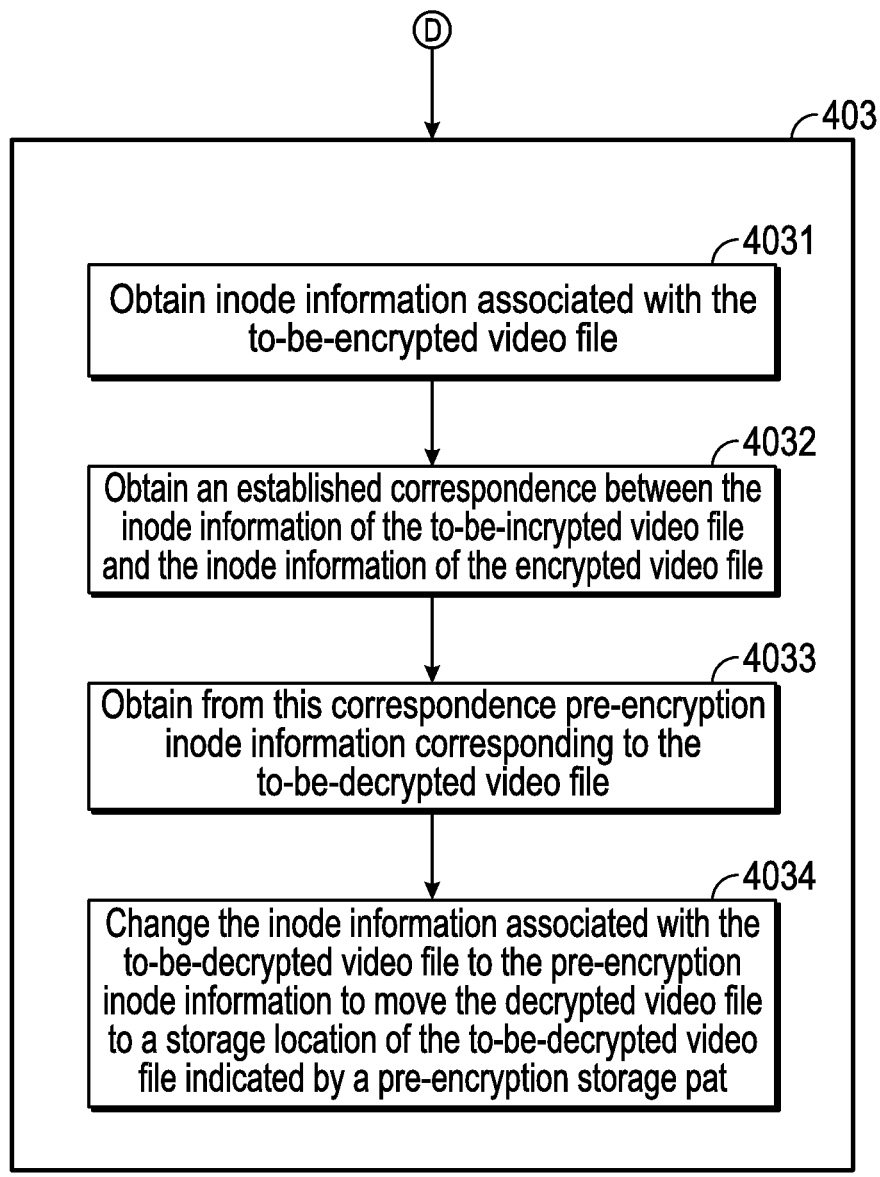

Referring to FIGS. 8*a* and 8*b*, another video file decryption method is provided in a fourth embodiment of the disclosure. The method can include:

401: obtaining a to-be-decrypted video file and a decryption key.

The to-be-decrypted video file can be a preview-required video file.

In particular, after encrypting the video file, the user can perform a decryption process or a preview process on the encrypted video file. The user can follow the prompting information displayed on the terminal to enter a correct key and select a to-be-decrypted video file to submit a decryption request to the terminal.

In particular, after receiving the decryption request, the terminal can obtain the to-be-decrypted video file and the key. In addition, the terminal can verify whether this key is the same as the key set by the user in the encryption method. If they are the same, the below-described processes can be performed. If not, the user can be prompt to enter the correct key.

402: decrypting the to-be-decrypted video file using the decryption key to obtain a decrypted video file.

This step can further include:

4021: reading header data having a second length and stored in a header of the to-be-decrypted video file.

In particular, it can include, after obtaining the to-be-decrypted video file, starting from the header of the to-be-decrypted video file, reading the header data having a second length.

4022: determining whether an encryption ID exists in the header data.

If none exists, it can determine that the to-be-decrypted video file has not been encrypted and exit the decryption process. If an encryption ID exists, the to-be-encrypted video file is an encrypted video file and step 4023 can be performed.

In particular, the header of the encrypted video file can include a designated header data have a second length. The designated header data can include a ciphertext storage area and the encryption ID. The encryption ID can mark an encrypted video file to prevent the user from encrypting the already-encrypted video file again. If the to-be-decrypted video file is an encrypted video file, its header data can include the encryption ID.

4023: obtaining a ciphertext storage area in accordance with the header data.

In particular, the to-be-decrypted video file can be an encrypted video file and the header data can include a ciphertext storage area.

4024: reading the ciphertext in accordance with the ciphertext storage area.

In particular, the ciphertext can be read from the ciphertext storage area after the ciphertext storage area is obtained.

4025: decrypting the ciphertext using the decryption key to obtain a plaintext, the decrypted ciphertext having a first length greater than a second length.

In particular, the ciphertext can be decrypted using the AES decryption algorithm to obtain the plaintext from decrypting the ciphertext. As described in the second embodiment of the disclosure, during the encryption process, the obtained plaintext having a first length can be encrypted. That is, the plaintext after the decryption can have a first length. As illustrated in FIG. 4, the first length can be L1.

4026: when the to-be-decrypted video file is a preview-required video file, reading the plaintext of the first length and the remaining data, and making a streaming video from the plaintext and the remaining data to be provided to a streaming media for broadcasting.

It should be noted that this step can be optional, depending on whether the to-be-decrypted video file is a preview-required video file. In operation, the user can preview the video file and then perform decryption on it. This can require performing a preview operation. This step can also include:

4026*a*: when the to-be-decrypted video file is a preview-required video file, reading a decrypted plaintext of a first length.

In particular, in operation, the plaintext can be stored in the memory to guarantee the security of the video file.

4026*b*: obtaining a preview-required video file storage area; subtracting from the preview-required video file storage area a storage area having a first length to obtain a storage area for the remaining data in the preview-required video file other than the header data and the ciphertext; and reading the remaining data from the storage area of the remaining area.

In particular, after obtaining the plaintext, obtaining the non-plaintext remaining data in the preview-required video file.

4026c: creating a streaming video using the plaintext and the remaining data and providing it to a streaming media to be played.

Figure 9:
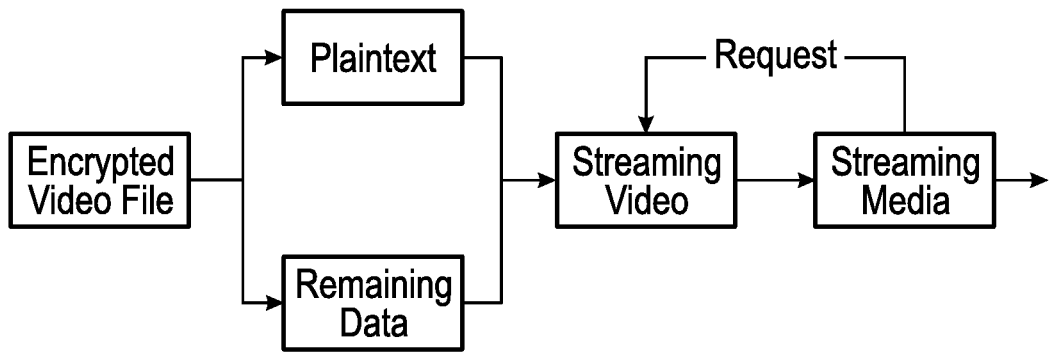
FIG. 9 is a schematic diagram illustrating the constructing of a streaming video, according to a fourth embodiment of the disclosure.

In particular, as illustrated in FIG. 9, the streaming media can continuously request the video data from the streaming video during the decoding process. This request can include the size and storage area of the data to be played. The streaming video can provide the data to the streaming media in accordance with the request from the streaming media. In particular, when the requested original video file is located in the encrypted data area, the streaming video can return the plaintext from the decrypted data area to the streaming media. When the requested data is located in a data area yet to be encrypted, i.e., the remaining data, the streaming video can read the data directly from the storage area and return to the streaming media. It should be noted that, after exiting the streaming media, the terminal can return the previewed video file to an encrypted status. These operations can be transparent to the user and, thus, guarantee the convenience of the operations.

4027: obtaining the decrypted video file in accordance with the decrypted ciphertext and remaining data in the to-be-decrypted video file other than the header data and the ciphertext.

This step can further include:

4027a: obtaining a to-be-decrypted video file storage area,

In particular, the to-be-decrypted video file storage area can be obtained in accordance with the to-be-decrypted video file. As illustrated in FIG. 6, the to-be-decrypted video file storage area can be designated [x, z], which can have a data storage length of L'.

4027b: starting from a start point of the to-be-decrypted video file storage area, obtaining a storage area having a first length as a plaintext storage area, In particular, as illustrated in FIG. 4, the plaintext storage area can be designated [x, n], which can have a data storage length of L1.

4027c: maintaining the remaining data in the to-be-decrypted video file, overwriting the plaintext storage area with plaintext to obtain the decrypted video file.

In particular, as illustrated in FIG. 4, the decrypted video file can be the to-be-encrypted file before being encrypted.

403: determining a pre-encryption storage location of the to-be-decrypted video file and moving the decrypted video file to the pre-encryption storage location of the to-be-decrypted video file.

This step can further include:

4031: obtaining inode information associated with the to-be-encrypted video file.

In particular, the inode information can include a storage path.

4032: obtaining an established correspondence between the inode information of the to-be-encrypted video file and the inode information of the encrypted video file.

In particular, the stored correspondence between the inode information of the to-be-encrypted video file and the inode information of the encrypted video file can be obtained from a database.

4033: obtaining from this correspondence pre-encryption inode information corresponding to the to-be-decrypted video file.

The pre-encryption inode information can include the pre-encryption storage path of the to-be-decrypted video file.

4034: changing the inode information associated with the to-be-decrypted video file to the pre-encryption inode information to move the decrypted video file to a storage location of the to-be-decrypted video file indicated by a pre-encryption storage path.

In particular, to allow the user to differentiate between the decrypted video file and the to-be-decrypted video file, after the decryption process, the inode information of the decrypted video file can be set to the pre-encryption inode information.

Some of the positive effects of the technical solutions provided in the embodiments of the disclosure can include: obtaining an encrypted video file by obtaining the to-be-encrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

Embodiment 5

Figure 10:
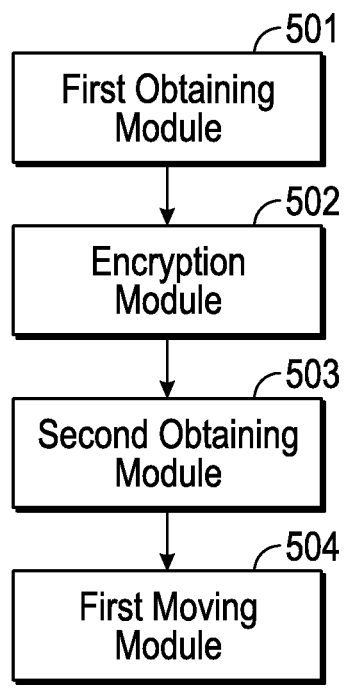
FIG. 10 is a schematic diagram of a video file encryption device, according to a fifth embodiment of the disclosure.

Referring to FIG. 10, a video encryption device is provided in a fifth embodiment of the disclosure. The device can include:

a first obtaining module 501 that obtains a to-be-encrypted video file and an encryption key, an encryption module 502 that encrypts the to-be-encrypted video file using the encryption key to obtain an encrypted video file, a second obtaining module 503 that obtains scanned non-hidden partitions of a mobile terminal and an extended memory of the mobile terminal for storing user data, and a first moving module 504 that determines a partition storing the to-be-encrypted video file among the non-hidden partitions and moves the encrypted video file to a folder in the partition storing the to-be-encrypted video file.

Some of the positive effects of the technical solutions provided in the embodiments of the disclosure can include: obtaining an encrypted video file by obtaining the to-be-encrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

Embodiment 6

Figure 11:
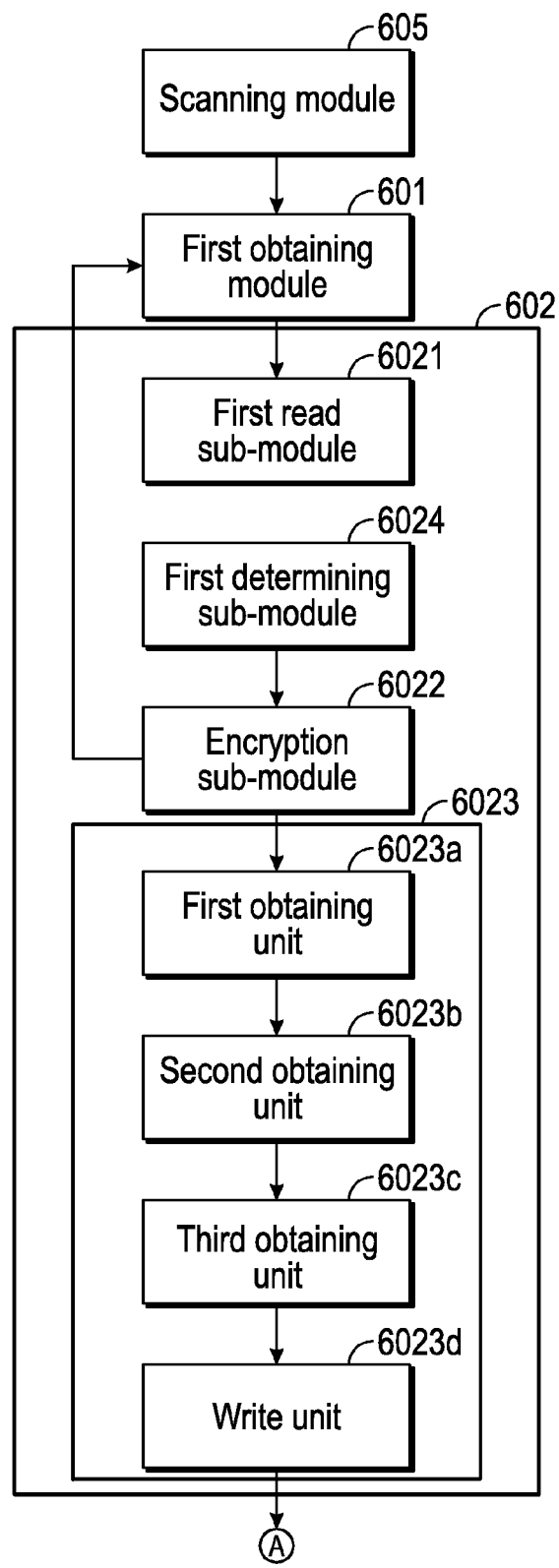
FIG. 11 is a schematic diagram of a video file encryption device, according to a sixth embodiment of the disclosure.
Figure 11:
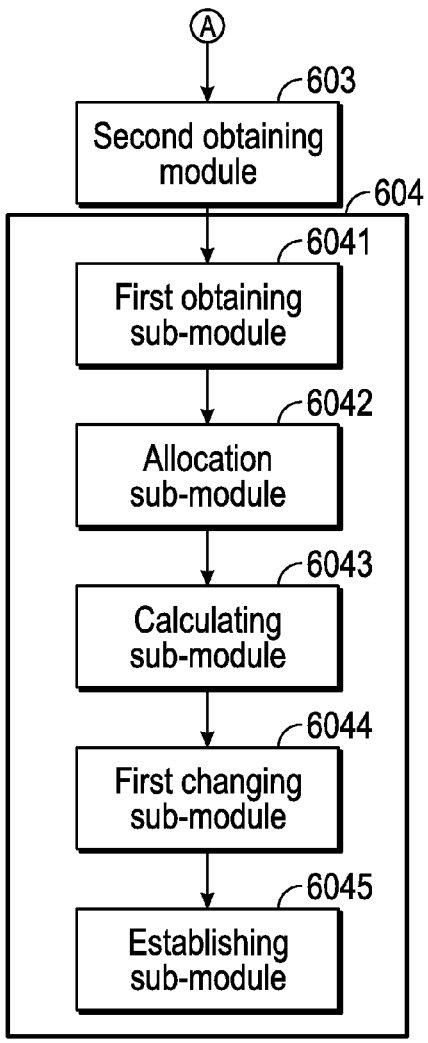

Referring to FIG. 11, a video file encryption device is provided in a sixth embodiment of the disclosure. The device can include:

a first obtaining module 601 that obtains a to-be-encrypted video file and an encryption key, an encryption module 602 that encrypts the to-be-encrypted video file using the encryption key to obtain an encrypted video file, The encryption module 602 can include:

a first read sub-module 6021 that reads a header data having a first length and stored in a header of the to-be-encrypted video file, an encryption sub-module 6022 that encrypts the header data using the encryption key to obtain ciphertext, and a write sub-module 6023 that obtains the encrypted video file in accordance with the ciphertext and remaining non-header data in the to-be-encrypted video file.

The write sub-module 6023 can include:

a first obtaining unit 6023a that obtains a header data storage area in the to-be-encrypted video file, a second obtaining unit 6023b that obtains, based on the header data storage area, a designated header data storage area having a second length, the second length less than the first length, the designated header data comprising the storage area for storing the encryption key and an encryption ID, In particular, the second obtaining unit 6023b, starting from a start point of the header data in the storage area for the to-be-encrypted video file, obtains a storage area having a second length as the designated header data storage area.

A third obtaining unit 6023c that obtains a ciphertext storage area.

In particular, the third obtaining unit 6023c can include:

A determining sub-module that obtains a length of the ciphertext, and determines whether the length of the ciphertext is greater than a difference between the first length and the second length.

A first ciphertext storage area sub-module that, if the length of the ciphertext is less than the difference, subtracting the designated header data storage area from the header data storage area to obtain the ciphertext storage area.

A second ciphertext storage area sub-module that, if the length of the ciphertext is greater than the difference, subtracting the header data storage area from the designated header data storage area to obtain a partial ciphertext storage area having a length equal to the difference, obtaining the storage area for the to-be-encrypted video file, starting from the end point of the to-be-encrypted video file in the storage area, obtaining a storage space having a length of a remaining part of the ciphertext to obtain a remaining ciphertext storage area.

A write unit that generates the designated header data while maintaining the remaining non-header data in the to-be-encrypted video file, and writes the designated header data and the encryption key into respective storage areas to obtain the encrypted video file.

A first determining sub-module 6024 that can determine whether an encryption ID exists in the header data. If an encryption ID exists, it can determine that the to-be-encrypted video file has been encrypted and exit the current encryption process.

Accordingly, the encryption sub-module 6022 can also determine that the to-be-encrypted file has not been encrypted, if no encryption ID exists, and use the key to encrypt the header data.

A second obtaining module 603 that obtains scanned non-hidden partitions of a mobile terminal and an extended memory of the mobile terminal for storing user data, and A first moving module 604 that determines a partition storing the to-be-encrypted video file among the non-hidden partitions and moves the encrypted video file to a folder in the partition storing the to-be-encrypted video file.

The first moving module 604 can include:

A first obtaining sub-module 6041 that obtains inode information associated with the to-be-encrypted video file, the inode information comprising a storage path, the inode information corresponding to video data.

An allocation sub-module 6042 that allocates, in accordance with the storage path associated with the to-be-encrypted video file, one of the partitions for storing the to-be-encrypted video file.

A calculating sub-module 6043 that calculates, in accordance with the folder of the partition storing the to-be-encrypted video file, a storage path associated with the encrypted video file so that the storage path associated with the encrypted video file points to the folder in the partition for storing the to-be-encrypted video file, obtaining inode information associated with the encrypted video file.

A first changing sub-module 6044 that changes the inode information associated with the to-be-encrypted video file to the inode information associated with the encrypted video file to move the encrypted video file to the folder of the partition for storing the to-be-encrypted video file.

An establishing sub-module 6045 that establishes a correspondence between the inode information associated with the to-be-encrypted video file and the inode information associated with the encrypted video file.

The device can also include:

A scanning module 605 that scans the non-hidden partitions of the mobile terminal and the extended memory of the mobile terminal, and creates a folder in each of the scanned partitions.

Some of the positive effects of the technical solutions provided in the embodiments of the disclosure can include: obtaining an encrypted video file by obtaining the to-be-encrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

Embodiment 7

Figure 12:
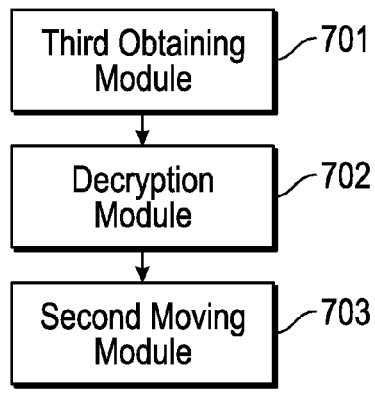
FIG. 12 is a schematic diagram of a video file decryption device, according to a seventh embodiment of the disclosure.

Referring to FIG. 12, a video file decryption device is provided in a seventh embodiment of the disclosure. The device can include:

A third obtaining module 701 that obtains a to-be-decrypted video file and a decryption key.

A decryption module 702 that decrypts the to-be-decrypted video file using the decryption key to obtain a decrypted video file.

A second moving module 703 that determines a pre-encryption storage location of to-be-decrypted video file and moves the decrypted video file to the pre-encryption storage location of the to-be-decrypted video file.

Some of the positive effects of the technical solutions provided in the embodiments of the disclosure can include: obtaining an encrypted video file by obtaining the to-be-encrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

Embodiment 8

Figure 13:
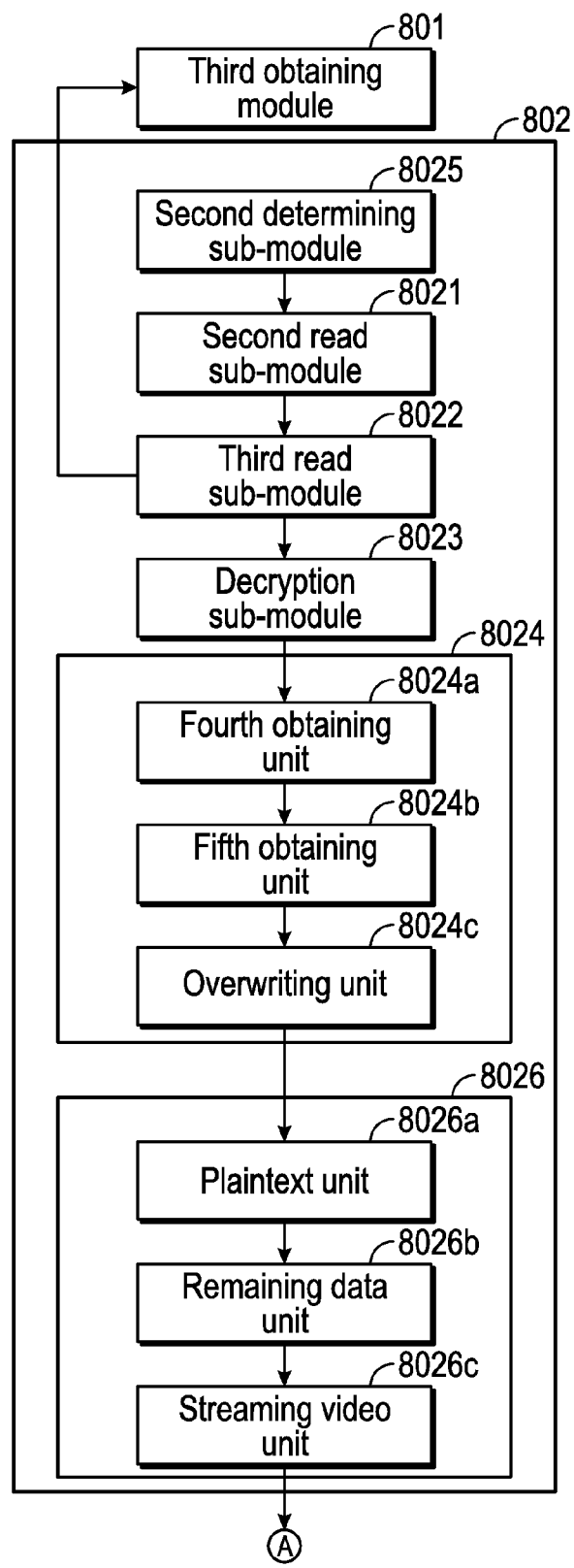
FIG. 13 is a schematic diagram of a video file decryption device, according to an eighty embodiment of the disclosure.
Figure 13:
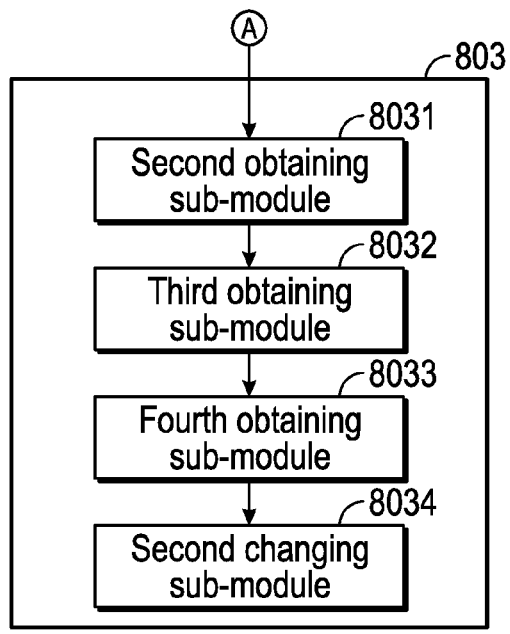

Referring to FIG. 13, a video file decrypting device is provided in an eighth embodiment of the disclosure. The device can include:

A third obtaining module 801 that obtains a to-be-decrypted video file and a decryption key.

A decryption module 802 that decrypts the to-be-decrypted video file using the decryption key to obtain a decrypted video file.

The decryption module 802 can include:

A second read sub-module 8021 that reads header data having a second length and stored in a header of the to-be-decrypted video file, obtaining a storage area of ciphertext in accordance with the header data, A third read sub-module 8022 that reads the ciphertext in accordance with the storage area of the ciphertext, A decryption sub-module 8023 that decrypts the ciphertext using the decryption key to obtain an plaintext, the plaintext having a first length greater than a second length, and An overwriting sub-module 8024 that obtains the decrypted video file in accordance with the plaintext and remaining data in the to-be-decrypted video file other than the header data and the ciphertext.

The overwriting sub-module 8024 can include:

A fourth obtaining module 8024a that obtains a storage area associated with the to-be-decrypted video file.

A fifth obtaining module 8024b that, starting from a start point of the storage area associated with the to-be-decrypted video file, obtains a storage area having the first length as a plaintext storage area.

An overwriting unit 8024c that maintains the remaining data in the to-be-decrypted video file, overwriting the plaintext storage space with the plaintext to obtain the decrypted video file.

The decryption module 802 can also include:

A second determining sub-module 8025 that can determine whether an encryption ID exists in the header data. If none exists, it can determine that the to-be-decrypted video file has not been encrypted and exit the decryption process.

Accordingly, the second read sub-module 8021 can also determine that, if an encryption ID exists, the to-be-encrypted video file is an encrypted video file and obtain the storage area of the ciphertext in accordance with the header data.

The to-be-decrypted video file can be a preview-required video file. The decrypting module 802 can also include:

A preview sub-module 8026 that reads the plaintext of the first length and the remaining data, and makes a streaming video from the decrypted text and the remaining data to be provided to a streaming media for broadcasting.

The preview sub-module 8026 can also include:

A plaintext unit 8026a that can read the plaintext of a first length from decrypting the to-be-decrypted video file to a preview video file.

A remaining data unit 8026b that can obtain the storage area of the preview-required video file, subtracting from the storage area of the preview-required video file a storage area having a first length to obtain the storage area for the remaining data in the preview-required video file other than the header data and ciphertext, and read the remaining data from the storage area for the remaining data.

A streaming video unit 8026c that can create a streaming video from the plaintext and the remaining data and provide it to a streaming media to be played.

A second moving module 803 that determines a pre-encryption storage location of to-be-decrypted video file and moves the decrypted video file to the pre-encryption storage location of the to-be-decrypted video file.

The second moving module 803 can include:

A second obtaining sub-module 8031 that obtains inode information associated with the to-be-decrypted video file, A third obtaining sub-module 8032 that obtains an established correspondence between inode information associated with a to-be-encrypted video file and inode information associated with an encrypted video file, A fourth obtaining sub-module 8033 that obtains, from the established correspondence, pre-encryption inode information corresponding to the inode information associated with the to-be-encrypted video file, the pre-encryption inode information comprising the to-be-encrypted video file and a pre-encryption storage path, and A second changing sub-module 8034 that changes the inode information associated with the to-be-decrypted video file to the pre-encryption inode information to move the decrypted video file to a storage location indicated by the pre-encryption storage path.

Some of the positive effects of the technical solutions provided in the embodiments of the disclosure can include: obtaining an encrypted video file by obtaining the to-be-encrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

Embodiment 9

Figure 14:
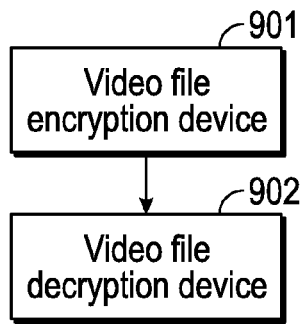
FIG. 14 illustrates an exemplary mobile terminal, according to a ninth embodiment of the disclosure.

Referring to FIG. 14, a mobile device is provided in the ninth embodiment of the disclosure. The mobile terminal can include the video file encryption device 901 and the video file decryption device 902.

In particular, the encryption device 901 can be the encryption device descripted in the fifth and sixth embodiments of the disclosure; the decryption device 902 can be the decryption device described in the seventh and eighth embodiments of the disclosure.

Some of the positive effects of the technical solutions provided in the embodiments of the disclosure can include: obtaining an encrypted video file by obtaining the to-be-encrypted video file and an encryption key and encrypting the to-be-encrypted video file using the encryption key; because the encrypted video file includes ciphertext, conventional video file descriptor cannot recognize the encrypted video file, thus providing better security; obtaining scanned non-hidden partitions of a mobile device and its extended memory allocated for storing user data; determining among the partitions the partition storing the to-be-encrypted video file, and moving the encrypted video file to a folder in the partition storing the to-be-encrypted video file; moving the encrypted video file to the folder in the partition including the pre-encryption storage location, because it is moving in the same partition, the speed of the move can be relatively fast, thereby reducing the time spent on encryption, increasing the encryption efficiency, and improving the market competitiveness of the product.

The embodiment numbers above are for description purpose only, and do not represent any preference among the described embodiments.

In some embodiments, one or more of the modules/units in FIGS. 9-14 can be stored and/or transported within any non-transitory computer-readable storage medium for use by or in connection with an instruction execution system, device, or device, such as a computer-based system, processor-containing system, or other system that can fetch the instructions from the instruction execution system, device, or device and execute the instructions. In the context of this file, a "non-transitory computer-readable storage medium" can be any medium that can contain or store the program for use by or in connection with the instruction execution system, device, or device. The non-transitory computer readable storage medium can include, but is not limited to, an electronic, magnetic, optical, electromagnetic, infrared, or semiconductor system, device or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 15:
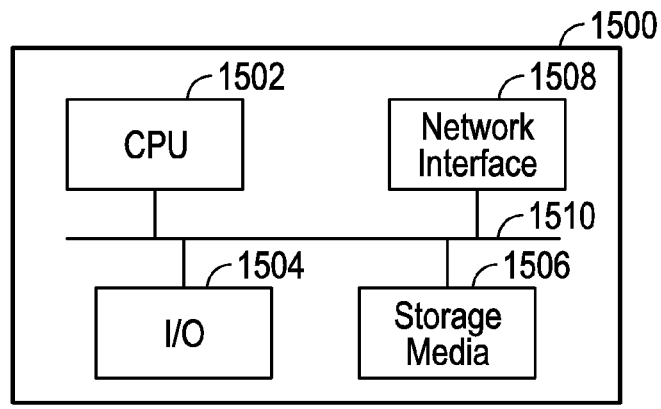
FIG. 15 illustrates exemplary common components of a computing system such as the devices and mobile terminals disclosed in the embodiments of the disclosure.

The non-transitory computer readable storage medium can be part of a computing system serving as the mobile terminal or device of the above-described embodiments of the disclosure. FIG. 15 illustrates exemplary common components of one such computing system. As illustrated, the system 1500 can include a central processing unit (CPU) 1502, I/O components 1504 including, but not limited to one or more of display, keypad, touch screen, speaker, and microphone, storage medium 1506 such as the ones listed in the last paragraph, and network interface 1508, all of which can be connected to each other via a system bus 1510. The storage medium 1506 can include the modules/units of FIGS. 9-14.

The above description presents only a relatively preferred embodiment of the present invention, and does not mean to restrict this invention. Any modification, equivalent replacement, improvement made on the basis of the spirit and principle of the present invention shall be included in the scope of protection for the present invention.

What is claimed is:

1. A video file encryption method, comprising:
   obtaining a to-be-encrypted video file and an encryption key, encrypting the to-be-encrypted video file using the encryption key to obtain an encrypted video file,
   obtaining scanned non-hidden partitions of a mobile terminal and an extended memory of the mobile terminal for storing user data,
   determining a partition storing the to-be-encrypted video file among the non-hidden partitions, and moving the encrypted video file to a folder in the partition storing the to-be-encrypted video file,
   wherein encrypting the to-be-encrypted video file using the encryption key to obtain the encrypted video file comprises:
      reading header data having a length equal to a first length wherein the header data is stored in a header of the to-be-encrypted video file,
      encrypting the header data using the encryption key to obtain ciphertext, and
      obtaining the encrypted video file in accordance with the ciphertext and remaining non-header data in the to-be-encrypted video file;
   wherein obtaining the encrypted video file in accordance with the ciphertext and the remaining non-header data in the to-be-encrypted video file comprises:
      obtaining a header data storage area in the to-be-encrypted video file,
      obtaining, based on the header data storage area, a designated header data storage area having a second length and a ciphertext storage area, wherein the second length is less than the first length, and the designated header data storage area comprises the ciphertext storage area and an encryption ID,
      generating designated header data while maintaining the remaining non-header data in the to-be-encrypted video file, and
      writing the designated header data and the encryption key into respective corresponding storage areas to obtain the encrypted video file,
   wherein obtaining the ciphertext storage area based on the header data storage area, comprises:
      obtaining a length of the ciphertext, and determining whether the length of the ciphertext is greater than a difference between the first length and the second length,
      wherein when the length of the ciphertext is less than the difference, subtracting the designated header storage area from the header area storage area to obtain the ciphertext storage area, and
      when the length of the ciphertext is greater than the difference, subtracting the header data storage area from the designated header data storage area to obtain a partial ciphertext storage area having a length equal to the difference, obtaining a first storage area for the to-be-encrypted video file, starting from an end point of the first storage area for the to-be-encrypted video file, and obtaining a remaining ciphertext storage area having a length of a remaining part of the ciphertext.

2. The method of claim 1, comprising:
   scanning, as part of a scan, the non-hidden partitions of the mobile terminal and the extended memory of the mobile terminal, and
   creating a folder in each of the partitions from the scan.

3. The method of claim 1, wherein obtaining, based on the header data storage area, the designating header storage area having the second length comprises:
- starting from a start point of the header data in the first storage area for the to-be-encrypted video file, obtaining a second storage area having the second length for storing data as the designated header data storage area.

4. A video file decryption method, comprising:
- obtaining a to-be-decrypted video file and a decryption key,
- decrypting the to-be-decrypted video file using the decryption key to obtain a decrypted video file, and
- determining a pre-encryption storage location of the to-be-decrypted video file and moving the decrypted video file to the pre-encryption storage location of the to-be-decrypted video file,
- wherein decrypting the to-be-decrypted video file using the decryption key to obtain the decrypted video file comprises:
  - reading header data having a second length and stored in a header of the to-be-decrypted video file and obtaining a ciphertext storage area in accordance with the header data,
  - reading ciphertext in accordance with the ciphertext storage area,
  - generating decrypted ciphertext using the decryption key to obtain a plaintext, the decrypted ciphertext having a first length greater than the second length, and
  - obtaining the decrypted video file in accordance with the decrypted ciphertext and remaining data in the to-be-decrypted video file other than the header data and the ciphertext,
- wherein obtaining the decrypted video file in accordance with the plaintext and remaining data in the to-be-decrypted video file other than the header data and the ciphertext comprises:
  - obtaining a to-be-decrypted video file storage area,
  - obtaining a new storage area having a the first length as a plaintext storage area,
  - maintaining the remaining data in the to-be-decrypted video file, and
  - overwriting the plaintext storage area with the plaintext to obtain the decrypted video file.

5. The method of claim 4, wherein the to-be-decrypted video file comprises a preview-required video file, the method comprising:
- reading the plaintext from the plaintext storage area of the first length and the remaining data, and making a streaming video from the plaintext and the remaining data to be provided to a streaming media to be played.

6. The method of claim 4, wherein determining the pre-encryption storage location of to-be-decrypted video file and moving the decrypted video file to the pre-encryption storage location of the to-be-decrypted video file comprises:
- obtaining inode information associated with the to-be-decrypted video file,
- obtaining an established correspondence between inode information associated with a to-be-encrypted video file and inode information associated with an encrypted video file,
- obtaining, from the established correspondence, pre-encryption inode information corresponding to the inode information associated with the to-be-encrypted video file, the pre-encryption inode information comprising the to-be-encrypted video file and a pre-encryption storage path,
- changing the inode information associated with the to-be-decrypted video file to the pre-encryption inode information to move the decrypted video file to a storage location indicated by the pre-encryption storage path.

7. A video file decryption device, comprising:
- a third obtaining module that obtains a to-be-decrypted video file and a decryption key,
- a decryption module that decrypts the to-be-decrypted video file using the decryption key to obtain a decrypted video file, and
- a second moving module that determines a pre-encryption storage location of to-be-decrypted video file and moves the decrypted video file to the pre-encryption storage location of the to-be-decrypted video file,
- wherein the decryption module comprises:
  - a second read sub-module that reads header data having a second length and stored in a header of the to-be-decrypted video file,
  - obtaining a ciphertext storage area of ciphertext in accordance with the header data,
  - a third read sub-module that reads the ciphertext in accordance with the storage area of the ciphertext,
  - a decryption sub-module that decrypts the ciphertext using the decryption key to obtain a plaintext, the plaintext having a first length which is greater than the second length, and
  - an overwriting sub-module that obtains the decrypted video file in accordance with the plaintext and remaining data in the to-be-decrypted video file other than the header data and the ciphertext,
- wherein the overwriting sub-module comprises:
  - a fourth obtaining module that obtains a first storage area associated with the to-be-decrypted video file,
  - a fifth obtaining module that, starting from a start point of the storage area associated with the to-be-decrypted video file, obtains a new storage area having the first length as a plaintext storage area, and
  - an overwriting unit that maintains the remaining data in the to-be-decrypted video file, overwriting the plaintext storage space with the plaintext to obtain the decrypted video file.

8. The device of claim 7, wherein the to-be-decrypted video file comprises a preview-required video file, and the decryption module comprises:
- a preview sub-module that reads the plaintext of the first length and the remaining data, and makes a streaming video from the plaintext and the remaining data to be provided to a streaming media for broadcasting.

9. The device of claim 7, wherein the second moving module comprises:
- a second obtaining sub-module that obtains inode information associated with the to-be-decrypted video file,
- a third obtaining sub-module that obtains an established correspondence between inode information associated with a to-be-encrypted video file and inode information associated with an encrypted video file,
- a fourth obtaining sub-module that obtains, from the established correspondence, pre-encryption inode information corresponding to the inode information associated with the to-be-encrypted video file, the pre-encryption inode information comprising the to-be-encrypted video file and a pre-encryption storage path, and
- a second changing sub-module that changes the inode information associated with the to-be-decrypted video file to the pre-encryption inode information to move the decrypted video file to a storage location indicated by the pre-encryption storage path.

* * * * *